United States Patent
Florez Choque et al.

(10) Patent No.: US 11,068,773 B2
(45) Date of Patent: Jul. 20, 2021

(54) MEMORY MANAGEMENT IN MEMORY AUGMENTED DEEP NEURAL NETWORKS

(71) Applicant: Capital One Services, LLC, McLean, VA (US)

(72) Inventors: Omar Florez Choque, Oakland, CA (US); Anish Khazane, San Francisco, CA (US); Erik T. Mueller, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 139 days.

(21) Appl. No.: 16/509,100

(22) Filed: Jul. 11, 2019

(65) Prior Publication Data

US 2021/0012182 A1    Jan. 14, 2021

(51) Int. Cl.
*G06N 3/04* (2006.01)
*G06F 17/16* (2006.01)
*G06N 3/08* (2006.01)

(52) U.S. Cl.
CPC .......... *G06N 3/0472* (2013.01); *G06F 17/16* (2013.01); *G06N 3/0454* (2013.01); *G06N 3/08* (2013.01)

(58) Field of Classification Search
CPC .......... G06N 3/0445; G06N 3/08; G06N 3/04; G06N 3/0454; G06N 3/063; G06N 3/082; G06N 3/02; G06N 3/0472; G06F 17/2818; G06F 1/3203; G06F 17/16
See application file for complete search history.

(56) References Cited

U.S. PATENT DOCUMENTS

| | | |
|---|---|---|
| 2013/0138436 A1 | 5/2013 | Yu et al. |
| 2014/0229158 A1 | 8/2014 | Zweig et al. |
| 2015/0161993 A1 | 6/2015 | Sainath et al. |
| 2016/0099010 A1 | 4/2016 | Sainath et al. |
| 2016/0180838 A1 | 6/2016 | Parada San Martin et al. |

(Continued)

OTHER PUBLICATIONS

Kaiser, Lukasz, Ofir Nachum, Aurko Roy, and Samy Bengio. "Learning to remember rare events." arXiv preprint arXiv:1703.03129 (2017). (Year: 2017).*

(Continued)

*Primary Examiner* — Baboucarr Faal
*Assistant Examiner* — Oluwatosin O Alabi
(74) *Attorney, Agent, or Firm* — Banner & Witcoff, Ltd.

(57) ABSTRACT

Memory augmented neural networks may use one or more neural encoders to transform input data into distributed representations and a memory module to store the representations with individual addresses. Memory augmented neural networks allow for few-shot learning capabilities because latent representations are persistent between training examples and gradient-based updates affect only certain memory locations via content-based lookups. When a query vector is not found in memory and the memory is full, existing memories that are positively associated with a particular representation may be identified, redundant memories may be aged, and updated memories may be generated. These updated memories retain relevant information acquired during training and reduce redundancy in the memories stored using the memory module, thereby improving the efficiency of data storage and reducing overfitting of data typically encountered with existing neural networks using memory modules.

20 Claims, 7 Drawing Sheets

(56) References Cited

U.S. PATENT DOCUMENTS

| | | | |
|---|---|---|---|
| 2016/0358071 | A1 | 12/2016 | Grefenstette et al. |
| 2017/0186420 | A1 | 6/2017 | Sak et al. |
| 2017/0228638 | A1 | 8/2017 | Danihelka et al. |
| 2017/0228643 | A1* | 8/2017 | Kurach .................. G06N 3/08 |
| 2020/0250003 | A1* | 8/2020 | Yang .................. G06F 16/538 |

OTHER PUBLICATIONS

Zhao, K., Li, Y., Zhang, C., & Yang, C. (2019). Adaptive Recurrent Neural Network based on Mixture Layer. arXiv preprint arXiv:1801.08094. (Year: 2019).*

Parisi, G. I., Tani, J., Weber, C., & Wermter, S. (2017). Lifelong learning of human actions with deep neural network self-organization. Neural Networks, 96, 137-149. (Year: 2017).*

Sun, J., Wang, S., & Zong, C. (2018). Memory, show the way: Memory based few shot word representation learning. In Proceedings of the 2018 Conference on Empirical Methods in Natural Language Processing (pp. 1435-1444). (Year: 2018).*

Harada, H. T. T. (2017). Memory augmented neural network with gaussian embeddings for one-shot learning. In NIPS2017 Workshop on Bayesian Deep Learning. (Year: 2017).*

Asghar, Nabiha, Lili Mou, Kira A. Selby, Kevin D. Pantasdo, Pascal Poupart, and Xin Jiang. "Progressive Memory Banks for Incremental Domain Adaptation."Proceedings of the 1st Adaptive & Multitask Learning Workshop, Long Beach, California, 2019. (Year: 2019).*

Adam Santoro et al, One-shot Learning with Memory-Augmented Neural Networks, arXiv:1605.06065v1 [cs.LG] May 19, 2016, pp. 1-13.

Alexander H. Miller et al, Key-value memory networks for directly reading documents. In Proceedings of the 2016 Conference on Empirical Methods in Natural Language Processing, pp. 1400-1409, Austin, Texas, Nov. 2016. Association for Computational Linguistics. doi: 10.18653/v1/D16-1147. URL <https://www.aclweb.org/anthology/> D16-1147.

Qi Qian et al, Distance Metric Learning Using Dropout: A Structured Regularization Approach, KDD'14, Aug. 24-27, 2014, New York, NY, © 2014 ACM 978-1-4503-2956-9/14/08, http://dx.doi.org/10.1145/2623330,2623678, pp. 1-10.

Ian J. Goodfellow et al, Generative Adversarial Nets, arXiv:1406.2661v1 [stat. ML] Jun. 10, 2014, pp. 1-9.

Dzmitry Bandanau et al, Neural Machine Translation by Jointly Learning to Align and Translate, published as a conference paper at ICLR 2015, arXiv:1409.0473v7 [cs.CL] May 19, 2016, pp. 1-15.

Kingma et al, Adam: A Method for Stochastic Optimization, published as a conference paper at ICLR 2015, arXiv:1412.6980v9 [cs.LG] Jan. 30, 2017, pp. 1-15.

Kaiming He et al, Deep Residual Learning for Image Recognition, arXiv:1512.033385v1 [cs.CV] Dec. 10, 2015, http://image-net.org/challenges/LSVRC/2015/ and http://mscoco.org/dataset/#detections-challenge2015, pp. 1-12.

Oriol Vinyals et al, Matching Networks for One Shot Learning, arXIV:1606.04080v2 [cs.LG] Dec. 29, 2017, pp. 1-12.

Melvin Johnson et al, Google's Multilingual Neural Machine Translation System: Enabling Zero-Shot Translation, arXiv:1611.04558v2 [cs.CL] Aug. 21, 2017, pp. 1-17.

Aijing Gao et al, Elevation of Hippocampal Neurogenesis Induces a Temporally Graded Pattern of Forgetting of Contextual Fear Memories, The Journal of Neuroscience, Mar. 28, 2018 38(13), pp. 3190-3198.

Alex Krizhevsky et al, ImageNet Classification with Deep Convolutional Neural Networks, http://code.google.com/p/cuds-convnet/, May 2017, pp. 1-9.

Ilya Sutskever et al, Sequence to Sequence Learning with Neural Networks, Dec. 13, 2014, pp. 1-9.

Koch et al, Siamese Neural Networks for One-shot Image Recognition, Proceedings of the 32nd International Conference on Machine Learning, Lille, France, 2015, JMLR: W&CP vol. 37, pp. 1-8.

Kishore Papineni et al, BLEU: a Method for Automatic Evaluation of Machine Translation, Proceedings of the 40th Annual Meeting of the Association for Computational Linguistics (ACL), Philadelphia, Jul. 2002, pp. 311-318.

Adam Santoro et al, Meta-Learning with Memory-Augmented Neural Networks, Proceedings of the 33rd International Conference on Machine Learning, New York, NY, 2016, JMLR: W&CP vol. 48, pp. 1-9.

Nitish Srivastava et al, Dropout: A Simple Way to Prevent Neural Networks from Overfitting, Journal of Machine Learning Research 15 (2014) pp. 1929-1958.

Mihail Eric et al, Key-Value Retrieval Networks for Task-Oriented Dialogue, Proceedings of the SIGDIAL 2017 Conferences, pp. 37-49, Saarbrucken, Germany Aug. 15-17, 2017, © 2017 Association for Computational Linguistics.

* cited by examiner

MEMORY MANAGEMENT IN MEMORY AUGMENTED DEEP NEURAL NETWORKS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to machine learning and more specifically to memory augmented neural networks.

BACKGROUND

Deep neural network models may contain millions of parameters that extract hierarchies of features from data, enabling them to learn from a large amount of data compared to earlier shallow networks. However, deep neural networks often suffer from over-fitting and a lack of generalization due to their large capacity. This may result from learning stages throughout the model training process. Due to the nature of deep neural networks, models may learn based on connecting input and output labels by extracting predictive features from the input, statistics associated with output labels (e.g., likelihood of the output itself), and connecting non-predictive features in the input to output labels. It is desirable that models focus on the predictive features and avoid learning from non-predictive aspects. Structuring model training processes so the model learns in this way has proven difficult, as deep neural networks typically maximize the conditional probability of the output given input features instead of maximizing mutual information between the output and input.

Aspects described herein may address these and other problems, and generally improve the quality, efficiency, and speed of machine learning systems by offering improved model training and performance through the management of memories in memory augmented neural networks.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Memory augmented neural networks may use one or more neural encoders to transform input data into distributed representations and a memory module to store the representations with individual addresses. Memory augmented neural networks allow for few-shot learning capabilities because latent representations are persistent between training examples and gradient-based updates affect only certain memory locations via content-based lookups. When a query vector is not found in memory and the memory is full, existing memories that are positively associated with a particular representation may be identified, redundant memories may be aged, and updated memories may be generated. These updated memories retain relevant information acquired during training and reduce redundancy in the memories stored using the memory module, thereby improving the efficiency of data storage and reducing overfitting of data typically encountered with existing neural networks using memory modules.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for memory augmented neural networks. Memory augmented neural networks may use a neural encoder to transform an input into distributed representations and use a memory module to store the distributed representations. The memory module may include a fixed number of slots, each slot storing the representation of the input as described in more detail herein. The number of slots in the memory module may be pre-determined and/or determined dynamically based on the desired performance of the memory augmented neural network and/or the class of input data being encoded. Memory augmented neural networks allow for few-shot learning capabilities as latent representations of received inputs are persisted between training examples using the memory module and (gradient-based) updates to the stored representations affect only certain memory locations via content-based lookups.

Existing neural networks employing a memory typically either select the oldest memory entry or randomly sample memory entries for overwriting when a query vector, generated based on a distributed representation, is not found in the memory module and the memory module is full. However, this approach leads to overfitting, thereby limiting the ability of the existing neural networks to generate accurate and correct responses to input data. Memory augmented neural networks in accordance with aspects of the invention identify and age redundant memories stored (e.g. data stored in a slot) in the memory module while generating new memories that retain relevant information acquired during training. In many embodiments, memory augmented neural networks determine a mathematical space in which the margin between positive and negative memories stored in the memory module is maximized while retaining the minimum number of positive memories in the memory module, thereby improving the efficiency of memory augmented neural networks to store data and reducing overfitting of data relative to existing neural networks.

Figure 1:
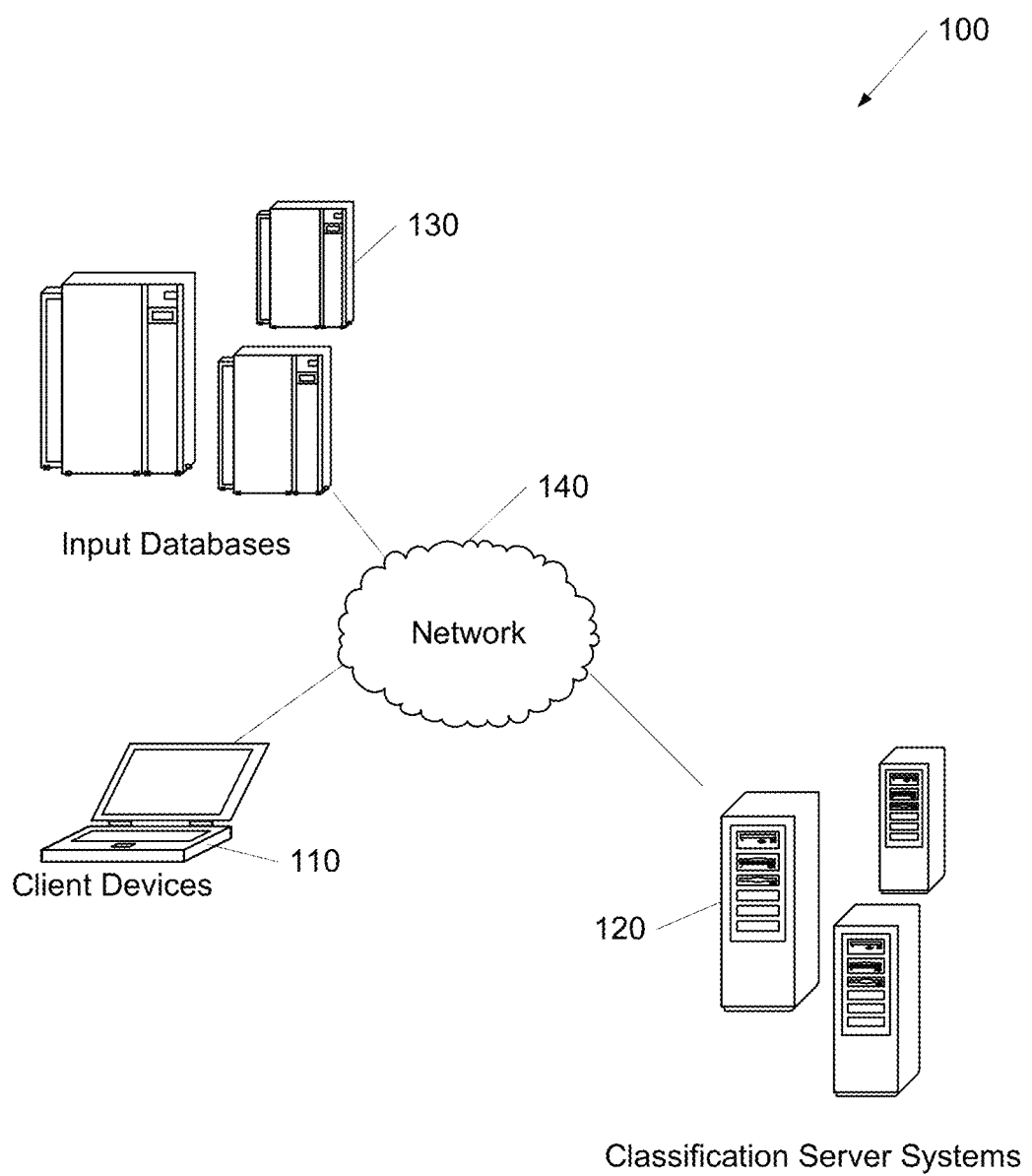
FIG. 1 illustrates an example of a system in which one or more aspects described herein may be implemented.

FIG. 1 illustrates a system 100 in accordance with an embodiment of the invention. The system 100 includes at least one client device 110, at least one classification server system 120, and/or at least input database 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

Client devices 110 may obtain a variety of input data, provide input data to a classification server system, and/or analyze responses generated by the classification server system as described herein. Classification server systems 120 may generate a variety of responses to input data using memory augmented neural networks as described herein. Input databases 130 may store a variety of input data and provide the input data as described herein. The network 140 may include a local area network (LAN), a wide area network (WAN), a wireless telecommunications network, and/or any other communication network or combination thereof.

Some or all of the data described herein may be stored using any of a variety of data storage mechanisms, such as databases. These databases may include, but are not limited to relational databases, hierarchical databases, distributed databases, in-memory databases, flat file databases, XML databases, NoSQL databases, graph databases, and/or a combination thereof. The data transferred to and from various computing devices in a system 100 may include secure and sensitive data, such as confidential documents, customer personally identifiable information, and account data. It may be desirable to protect transmissions of such data using secure network protocols and encryption and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
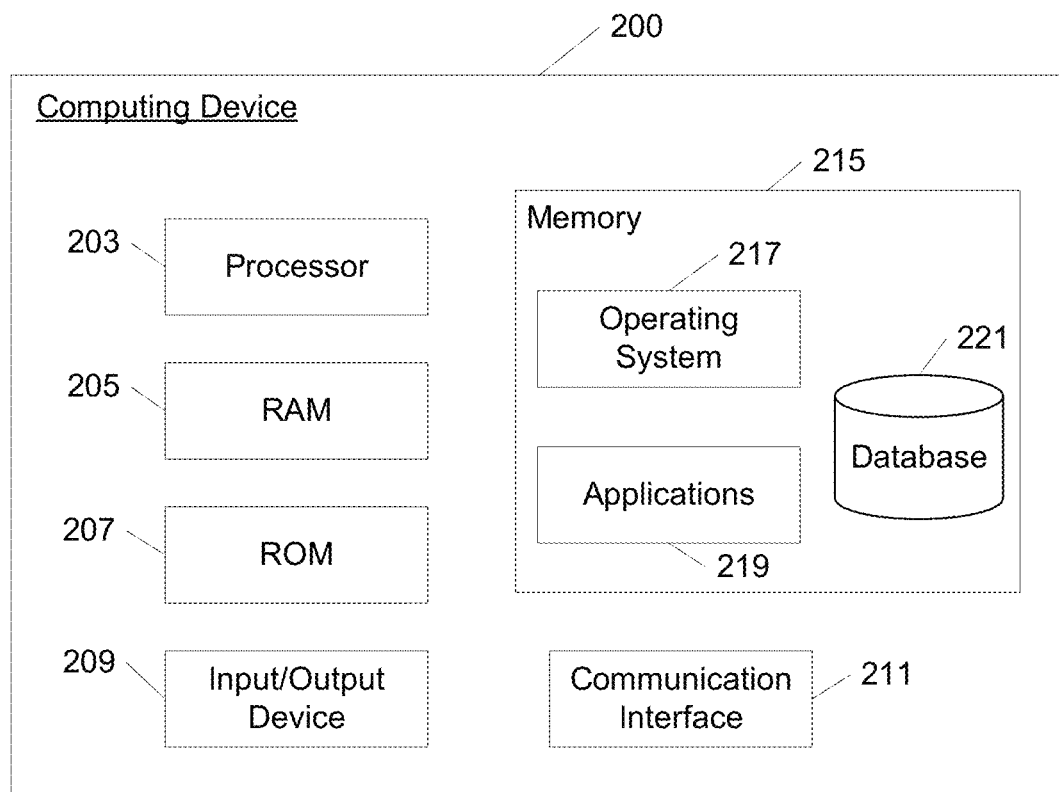
FIG. 2 illustrates an example computing device in accordance with one or more aspects described herein.

Turning now to FIG. 2, a computing device 200 in accordance with an embodiment of the invention is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Communication interface 211 may include one or more transceivers, digital signal processors, and/or additional circuitry and software for communicating via any network, wired or wireless, using any protocol as described herein. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
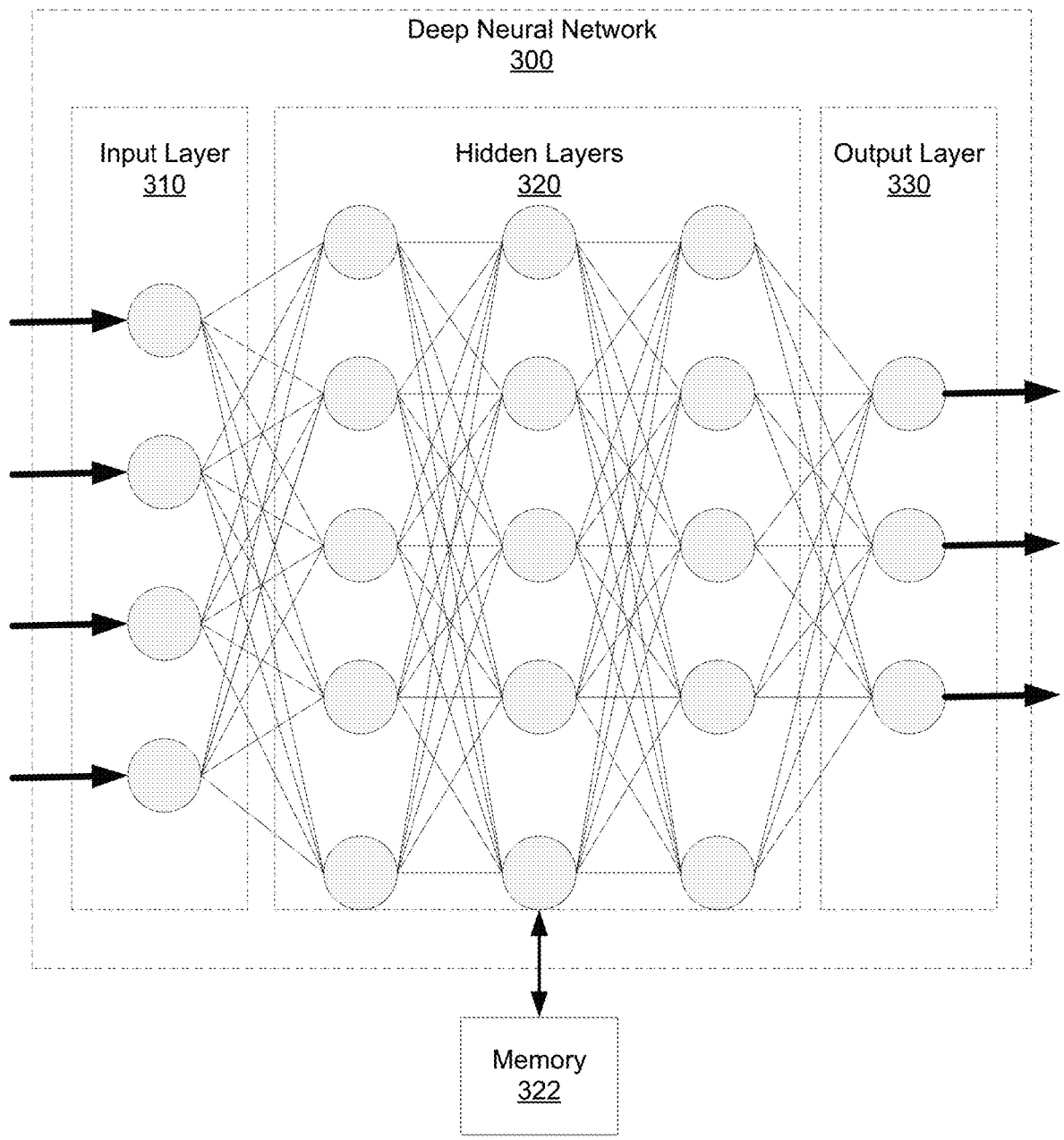
FIG. 3 depicts a memory augmented neural network according to one or more aspects of the disclosure.

FIG. 3 depicts a memory augmented neural network 300 according to one or more aspects of the disclosure. A memory augmented neural network may include a collection of connected nodes, with the nodes and connections each having assigned weights used to generate predictions. Each node in the memory augmented neural network may receive input and generate an output signal. The output of a node in the memory augmented neural network may be a function of its inputs and the weights associated with the edges. Ultimately, the trained model may be provided with input beyond the training set and used to generate predictions regarding the likely results. Memory augmented neural network may have many applications, including object classification, image recognition, speech recognition, natural language processing, text recognition, regression analysis, behavior modeling, and others.

A memory augmented neural network may have an input layer 310, one or more hidden layers 320, and an output layer 330. A memory augmented neural network, as described herein, may be a deep neural network that has more than one hidden layer. Illustrated network architecture 300 is depicted with three hidden layers, and thus may be considered a deep neural network. Each node in the memory augmented neural network may be associated with one or more parameters (e.g. weights) that control the performance of the node within the memory augmented neural network. The number of hidden layers employed in deep neural network 300 may vary based on the particular application and/or problem domain. For example, a network model used for image recognition may have a different number of hidden layers than a network used for speech recognition. Similarly, the number of input and/or output nodes may vary based on the application. A variety of neural network structures may be used to implement memory augmented neural network 300 including, but not limited to, decision trees, k-nearest neighbors, support vector machines (SVM), neural networks (NN), recurrent neural networks (RNN), convolutional neural networks (CNN), and/or probabilistic neural networks (PNN). RNNs may further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers may be utilized, more specific machine classifiers when available, and general machine classifiers at other times may further increase the accuracy of predictions. Aspects described herein may be used with any type of neural network structure, and for any suitable application, particularly where a maximum likelihood objective is used during training.

Hidden layers 320 may utilize a memory module 322. Memory module 322 may include a number of slots. The number of slots available in a memory module may be pre-determined and/or determined automatically based on the class of data to be labeled by the memory augmented neural network. For example, a memory augmented neural network generating responses for a multi-turn dialog data set may utilize one thousand memory slots, while a memory augmented neural network classifying features in image data may utilize two hundred memory slots. A slot in memory module 322 may include a key, at least one value, an age, and a variance. In a variety of embodiments, memory module 322 may be stored using a two-dimensional matrix, a set of arrays, and/or any other data structure. A key may be a memory address (or any other index) used to locate a particular value (or values) stored in the memory module 322. The one or more values stored in a particular slot may include class labels generated for a particular piece of input data. In several embodiments, the memories stored using memory module 322 may be represented using a differentiable Gaussian mixture model parameterized by the locations of each memory and their covariance matrices.

Figure 4:
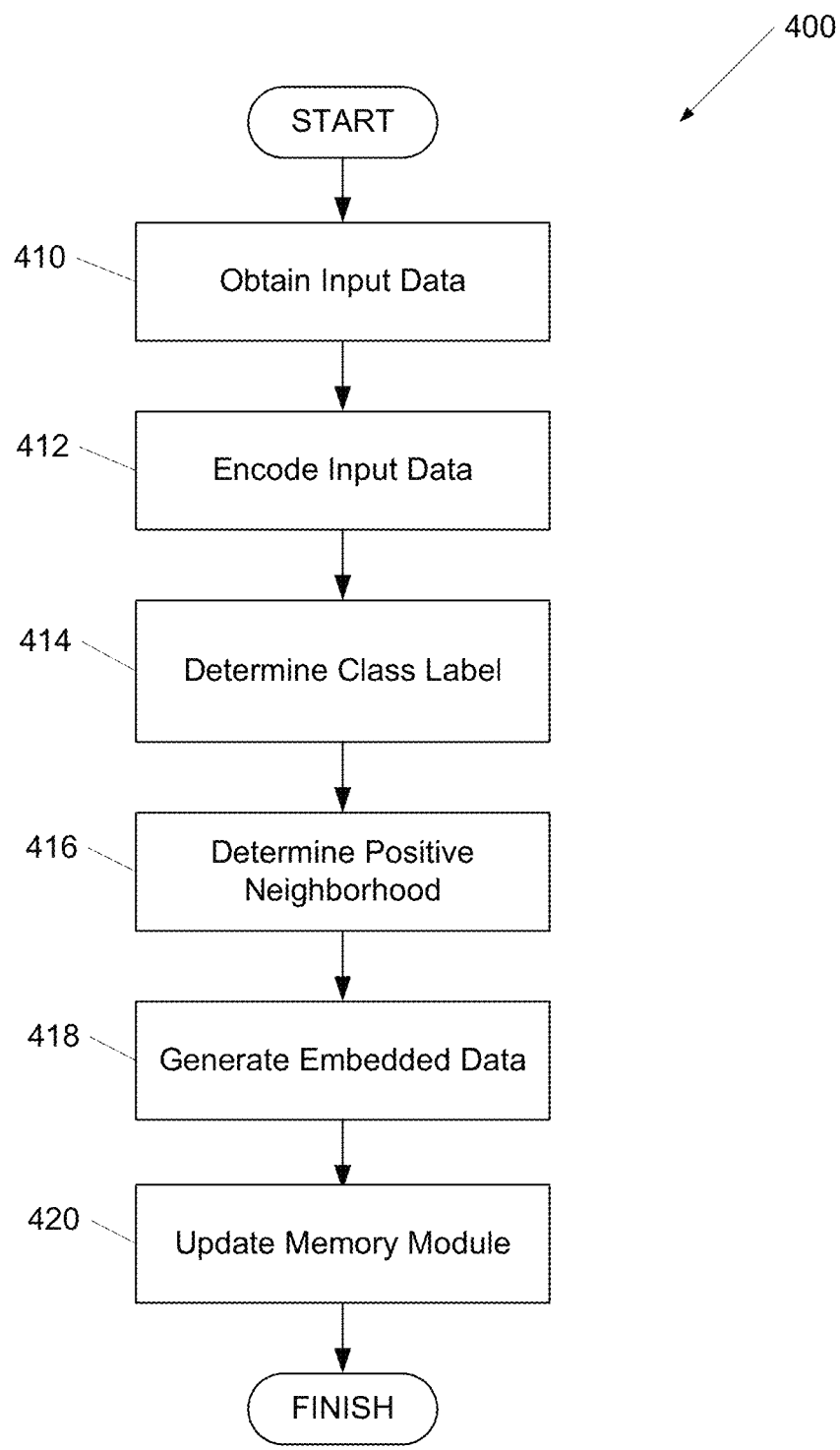
FIG. 4 depicts a flow chart for updating a memory module according to one or more aspects of the disclosure.

FIG. 4 depicts a flow chart for updating a memory module according to one or more aspects of the disclosure. Some or all of the steps of process 400 may be performed using any of the computing devices and/or combination thereof described herein.

At step 410, input data may be obtained. The input data may include any class of data for which a memory augmented neural network may be trained to generate class labels. In a variety of embodiments, the input data includes multi-turn dialog data, such as a set of questions and a set of responses. The input data may include a sequence of inputs with dependencies between particular items in the input data. For example, the input data may include a dialog with queries and automatic responses generated for the provided queries, such as locating an event on a calendar of activities, the weekly weather forecast for nearby cities, and relevant information for point-of-interest navigation. In several embodiments, the input data includes image data, where each image in the image data may include a set of features to be annotated with class labels.

At step 412, input data may be encoded. The input data may be encoded for processing by the memory augmented neural network. The encoded input data may include a vector representation of the input data. A vector representation of input data may include a set of features identified within the input data. For example, the input data may be a step in a multi-turn dialog set having a set of keywords and the encoded input data may include stemmed keywords that may be used to determine the meaning of the step expressed in the multi-turn dialog set and the label may indicate the class of message associated with the step. The input data may be used to infer additional elements, such as responses to a step in a multi-turn dialog, based on historical responses (such as those described in the item data) and a knowledge base encoded in the memory module as described in more detail herein. In a variety of embodiments, the input data may be encoded using a long short-term memory neural network, although any encoder may be used as appropriate.

At step 414, one or more class labels may be determined. The class label may be generated based on the encoded input data and indicate the identified class of the input data. The class label for an encoded input may be determined by the memory augmented neural network and/or be a ground truth label. Ground truth labels may be provided in a training data set and/or by a previous encoding by the memory augmented neural network. In a variety of embodiments, the class labels may be determined based on the encoded input and one or more memories stored in a memory module. For example, a dialogue history may be encoded using an encoder LSTM neural network and a response (e.g. class label) may be generated using a decoder LSTM neural network. The decoder output may be combined with a query to a memory module that returns an attention map centered at a particular memory entry stored in a tabular format. The memory entry may be decomposed from the tabular format to a collection of triplets expressing a relationship (e.g. subject, relation, object). For example, ('gym', 'date', 'the 8th') may be normalized to the key h=LSTM(['gym', 'date']), the output of an LSTM conditioned on the decoder output, and its corresponding value 'gym_date', a combination of the subject and relation attributes in canonized form. The concatenation of both attention maps induce a distribution over the entire vocabulary (vocabulary words and entries stored in the memory module) and a function, such as a softmax function, may be used to compute the predicted output (e.g. class label). During inference, inverse lookups may be used to convert the value in canonical representation 'gym_date' back to its original object attribute 'the 8th'.

In a variety of embodiments, a class label is determined by a neural network encoder, such as a LSTM encoder, that obtains data from the memory module. The neural network encoder may include the memory module and a set of gates. As described herein, the memory module stores a set of encoded data and associated class labels, while the set of gates controls how new data is generated, retained, and/or output by the neural network encoder. In several embodiments, an activation function, such as a logistic function, may be used to determine a particular output (e.g. class label) generated for the input data by the neural network encoder. A set of parameters may be defined for various cells and gates within the neural network encoder that control the operation of the gates. The parameters may be used to weight the activations of the gates within the neural network encoder during the generation of a class label for the input data. These parameters may be refined, such as via back-propagation, to train the neural network encoder to generate accurate class labels based on a set of training data. Any back-propagation techniques, such as gradient descent, may be used as appropriate. In a number of embodiments, the parameters may be used to assign a weight to the use of particular memories stored in the memory module in the generation of a class label for a particular input. In many embodiments, the weight may be assigned based on a similarity score between the input data being classified by the neural network encoder and encoded data (with associated class labels) stored in the memory module.

At step 416, a positive neighborhood may be determined. A positive neighborhood may be determined for the encoded input and class label. A positive neighborhood may include memories corresponding to the encoded input and having a class label matching the determined class label and stored in a memory module. As described herein, memories stored using a memory module may be represented using a differentiable Gaussian mixture model parameterized by the locations of each memory and their covariance matrices. In a variety of embodiments, positive memories may be sampled from the memory module based on a distance from the encoded input to the positive memories within the Gaussian mixture model of the memory module. In many embodiments, the distance may be calculated based on a cosine similarity between the encoded input and the positive memories. In several embodiments, a subset of positive memories are selected as the positive neighborhood based on the distance from the subset of memories to the encoded input data being within a threshold distance. A number of techniques for determining positive neighborhoods are describe in more detail with respect to FIG. 5.

At step 418, embedded data may be generated. The embedded data may include generating a representative encoding that represents both the encoded input data and the memories in the positive neighborhood. In several embodiments, the representative encoding is generated by sampling from the Gaussian mixture model generated with respect to the positive neighborhood. The embedded data may correspond to the encoded input data, a memory already stored in the memory module, or a new representative encoding. In many embodiments, an age and/or variance is calculated for the embedded data. A variety of techniques for generating embedded data are described in more detail with respect to FIG. 6.

At step 420, the memory module may be updated. The memory module may be updated by storing the embedded data and class label in the memory module. In a variety of embodiments, an age and/or variance are determined for the embedded data and stored in the memory module. The specific slot to which the data is stored may be determined based on the age of the memories in the determined positive neighborhood. In this way, positive memories are not immediately removed; rather the positive memories are removed as more observations are made. In many embodiments, a current maximum age (e.g. the maximum age currently assigned to any slot in the memory module) to the memories in the positive neighborhood. This has the effect of increasing the probability of positive memories being overwritten by sampling in later iterations of processing data. This allows for a delayed regularization mechanism for storing memories in the memory module. This has a less aggressive effect than randomly removing positive memories, as performed by existing neural networks, as the random removal of positive memories quickly overwrites a large number of memories, thereby degrading the information stored in the memory module. In this way, updating the memory module in memory augmented neural network described herein preserves the information stored in the memory module while intelligently selecting positive memories for replacement, improving the ability of the memory augmented neural network to generate accurate class labels and reducing overfitting of data. In a number of embodiments, the slot in which the data is stored is selected based on the distance between the data and the positive memories determined in the Gaussian mixture model representing the memory module. A variety of techniques for storing memories in a memory module are described in more detail with respect to FIG. 7.

In a variety of embodiments, storing a memory in the memory module includes updating the age on the memories remaining in the positive neighborhood. In many embodiments, the age of these memories may be set as the highest current age, thus increasing the probability of overwriting these in later training steps. This may reduce overfitting and improve the performance of the memory augmented neural network by accurately identifying those memories currently stored in the memory module (e.g. the memories in the positive neighborhood) that are statistically represented by the newly stored embedded data, and therefore are redundant to the newly stored embedded data. In this way, the memory module may store memories that are statistically unique and therefore allow the memory augmented neural network to generate accurate classifications of a variety of input data.

Figure 5:
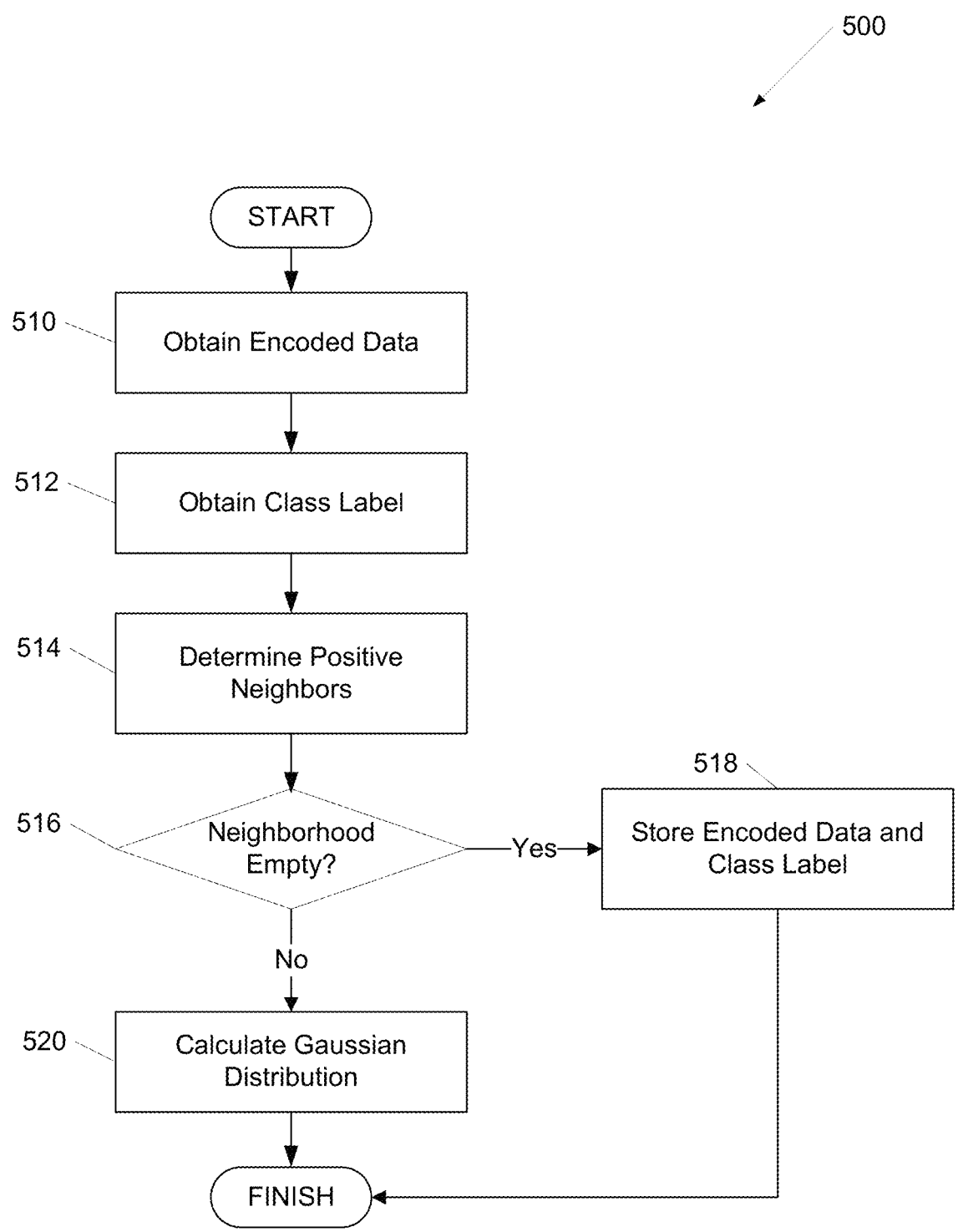
FIG. 5 depicts a flow chart for determining a positive neighborhood according to one or more aspects of the disclosure.

FIG. 5 depicts a flow chart for determining a positive neighborhood according to one or more aspects of the disclosure. Some or all of the steps of process 500 may be performed using any of the computing devices and/or combination thereof described herein.

At step 510, encoded data may be obtained. The encoded data may include generating a representative encoding that represents both input data and/or corresponding memories in the positive neighborhood. The representative encoding may include a vector representation of one or more pieces of input data being classified using a memory augmented neural network. In several embodiments, the representative encoding is generated by sampling from the Gaussian mixture model generated with respect to the positive neighborhood. The encoded data may correspond to the encoded input data, a memory already stored in the memory module, or a new representative encoding. In a variety of embodiments, the encoded data has a size of 256 elements and the encoded data is obtained using a bidirectional LSTM neural network with three layers and a state size of 256 in each direction.

At step 512, a class label may be obtained. The class label may be obtained based on a classification performed on the encoded data using any machine classifier as described herein. The class label may be obtained as ground truth label from a set of training data including the encoded data. In a variety of embodiments, the class label is obtained as described herein with respect to FIG. 4. In many embodiments, the class label is obtained using a bidirectional LSTM neural network with three layers and a state size of 256 in each direction.

At step 514, positive neighbors may be determined. The positive neighbors may include memories stored in a memory module having the same class label as the obtained class label. In a number of embodiments, the memory module has 1000 slots for storing memories. In a variety of embodiments, the positive memories are determined by querying the memory module to determine memories having the same label as the obtained class label. The positive neighbors may be determined in order to identify the optimal location for storing the embedded encoded and class label. The positive neighborhood for the encoded data represents the neighborhood of the encoded data formed by the most similar memories stored in the memory module. These memories may be positive or negative depending on whether they share the same class label as the obtained class label.

At step 516, the determined neighborhood of positive memories may be empty. In this case, no memories are stored in the memory module having the same class label and the positive neighborhood is empty. When the positive neighborhood is empty, the oldest memory stored in the memory module ($i_{oldest}$) may be identified and overwritten by the encoded data and class label as follows:

$$i_{oldest} := \mathrm{argmax}\{A + \mathcal{N}(0, \alpha)\}$$

$$K[i_{oldest}] := h \ V[i_{oldest}] := y \ A[i_{oldest}] := 0 \ S[i_{oldest}] := 1.0$$

where K is the encoded data, V is the class label, A is the age, and S is the variance. In many embodiments, the age of the memories in the memory module may be modified by a random number to introduce some randomness in the choice and avoid race conditions. Although this example shows a variance of 1.0, any variance may be used as appropriate. In this way, the encoded data and class label may be stored at step 518.

At step 520, a Gaussian distribution may be calculated. Given encoded data h, the set of P positive keys $$K^+ = \{k_1^+, \ldots, k_P^+\}$$

may be a sub-population of the memories stored in the memory module that may be represented as a linear superposition of P Gaussian components, providing a rich class of a density model, in the form $$p(k^+) = \sum_{p=1}^{P} \pi_p \mathcal{N}\left(k^+ \mid \mu_p, \sum_p\right)$$

where each Gaussian is centered at a positive key $$\mu_p = k_p^+$$

with covariance matrix $$\Sigma_p = \mathrm{diag}(s_p^+)$$

In several embodiments, without the variances stored for memories in the memory module, encoded data stored in the keys may dominate the likelihood probability because the uncertainty of each key will not be available. Accordingly, it is preferred to store variances for each memory stored using the memory module.

Figure 6:
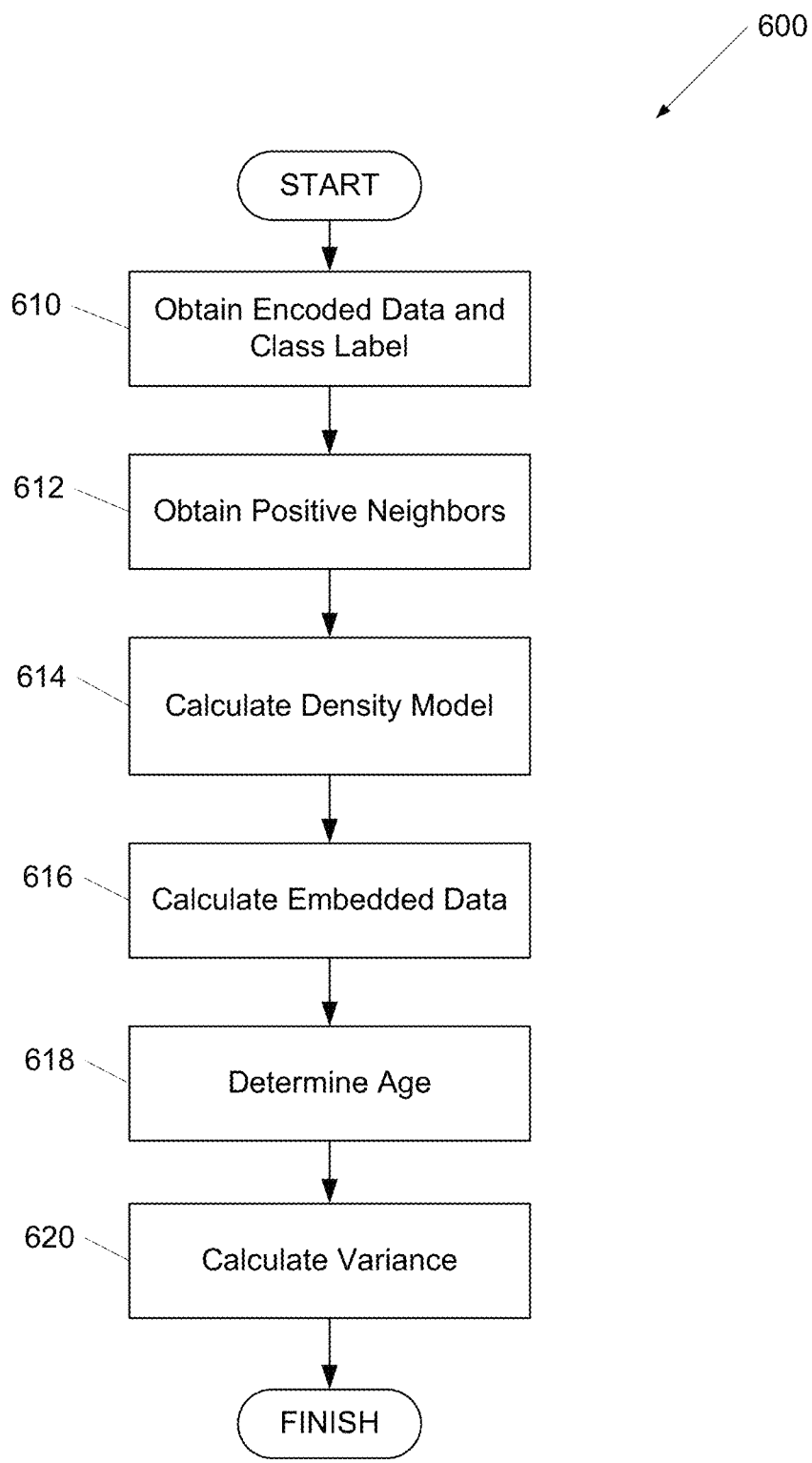
FIG. 6 depicts a flow chart for generating embedded data according to one or more aspects of the disclosure.

FIG. 6 depicts a flow chart for generating embedded data according to one or more aspects of the disclosure. Some or all of the steps of process 600 may be performed using any of the computing devices and/or combination thereof described herein.

At step 610, encoded data and class labels may be obtained. The encoded data and class label may be obtained as described herein. At step 612, positive neighbors of the encoded data may be obtained based on the class label as described herein.

At step 614, a density model may be calculated. The density model may be a probabilistic distribution of the positive neighborhood within the memory module based on the encoded data and/or class label. In a variety of embodiments, the density model may include a Gaussian mixture model calculated as described herein. In several embodiments, a vector of probabilities $$\pi = \{\pi_1, \ldots, \pi_P\}$$

that quantifies the mixing coefficients of the Gaussian components that may be defined in terms of how similar are the positive keys $K^+$ to h may be defined as:

$$\pi = \text{Softmax}(K^+ \cdot h) \text{ such that } 0 \leq \pi_p \leq 1 \text{ and } \sum_{p=1}^{P} \pi_p = 1$$

At step 616, embedded data may be calculated. The embedded data may be a synthetic data point that statistically represents the encoded data and/or class label within the density model generated based on the positive neighborhood. In a number of embodiments, the conditional distribution of embedded data k' (e.g. a new key) given a particular Gaussian distribution may be defined as:

$$p(k'|\pi_{p=i}) = \mathcal{N}(k'|\mu_i, \Sigma_i)$$

Sampling the embedded data k' may include first sampling an index i from a set of Gaussian mixture components under the distribution and generating a random variable from:

$$p(k'|\pi_{p=i})$$

As being a sample from this distribution, the new embedded data k' may be representative of the sub-population of positive memories in the neighborhood. A new memory may be generated based on k' and the class label. At step 618, the age of the embedded data may be determined. The age of the memory may be set to an arbitrary value, such as zero, to make it more persistent during training. At step 620, the variance may be computed. In many embodiments, the embedded data K[i], age A[i], and variance S[i] may be calculated as:

$$K[i]:=\|k'+h\| \; A[i]:=0 \; S[i]:=(k'-h)^2$$

The variance may be used to track the average uncertainty of embedded data in encoding input data and/or determining class labels based on memories stored using the memory module.

Figure 7:
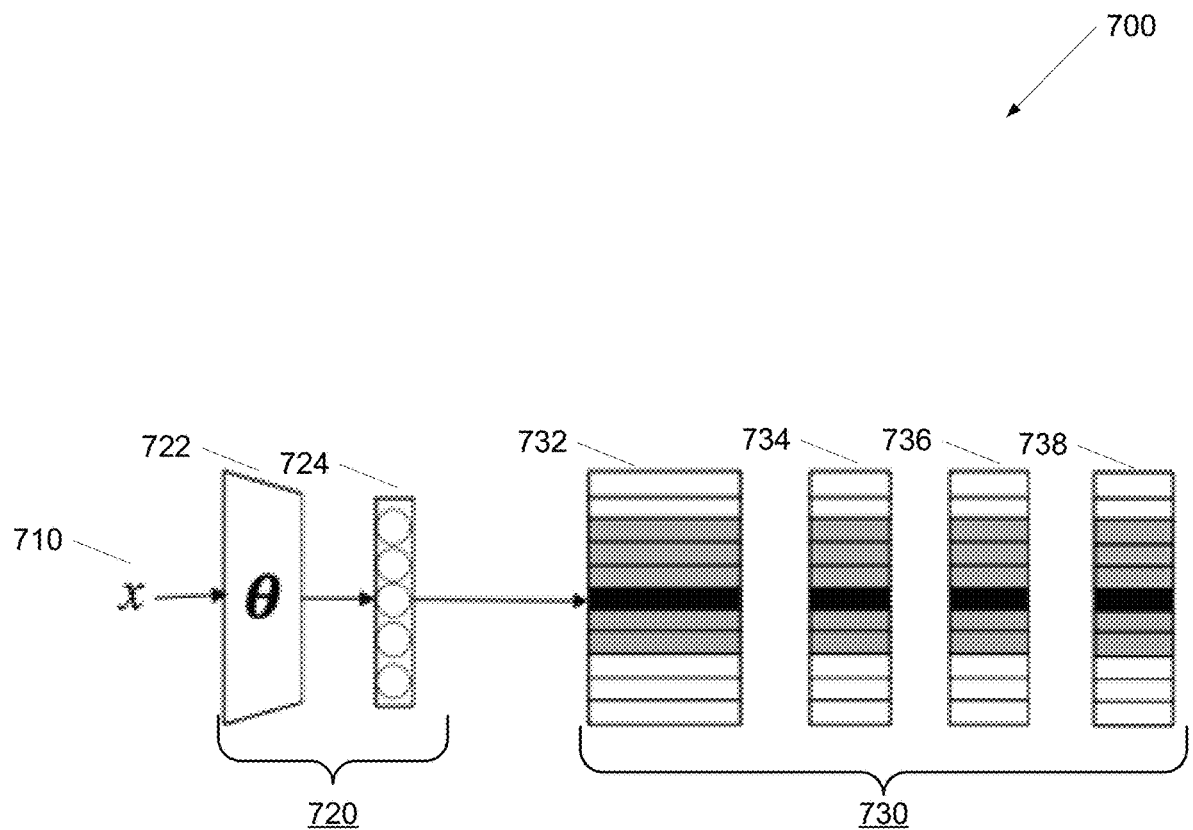
FIG. 7 illustrates an example of updating a memory module according to one or more aspects of the disclosure.

FIG. 7 illustrates an example of updating a memory module according to one or more aspects of the disclosure. Some or all of the data, calculations, and structures shown in example 700 may be stored and/or performed using any of the computing devices and/or combination thereof described herein.

Example includes input data 710, encoder/decoder 720, and memory module 730. Encoder/decoder 720 includes parameters (θ) 722 and embedded data (h) 724. As described herein, embedded data 724 may include an encoded input (e.g. key), a class label, an age, and a variance. The encoded input 724 may be stored using memory module 730. Memory module 730 includes a number of slots, each slot having a key (K) 732, value (V) 734, age (A) 736, and variance (S) 738.

In a variety of embodiments, an encoder portion of a memory augmented neural network, with trainable parameters θ, obtains an observation (e.g. input data) x and generates embedded data h in a hidden layer as described herein. Memory module 730 may be used to store h in the memory module 730 to increase the model capacity and preserve learned representations. Let $$\{i_1, \ldots, i_k\} = KNN(h, k)$$

denote the positive neighborhood of h formed by its k nearest stored memories. In many embodiments, the k nearest stored memories are determined based on a cosine similarity with respect to h. The feed-forward step of example 700 may be a read-only operation as follows:

$$h = f(x, \theta)$$

$$i_{max} = \text{argmax}_i\{h \cdot K[i]\}$$

$$y = V[i_{max}]$$

where f is any neural encoder and $i_{max}$ is the index of the most similar key to h.

As the training of a memory augmented neural network progresses, the encoder generates more discriminative versions of h for a particular input. During training, writing these observations in the memory module allows for the computation of error signals and generation of gradients that flow through the entire memory augmented neural network with back-propagation. In a variety of embodiments, these error signals and/or gradients may be used to tune the parameters θ to improve the performance of the memory augmented neural network. In several embodiments, the neighborhood of h may be used to determine indices of those memories close to h. These indices may be used to determine which indices correspond to keys with values storing the same class label y and denote them as positive keys $K[i^+]$ or negative keys $K[i^-]$ otherwise. In many embodiments, the most similar positive key $K[i_{max}]$ may be identified and updated in the direction of h as follows:

$$K[i_{max}^+]:=\|K[i_{max}^+]+h\| \; A[i_{max}^+]:=0 \; S[i_{max}^+]:=(K[i_{max}^+]-h)^2$$

In several embodiments, the quadratic difference between $K[i_{max}^+]$ and h accounts for the observed uncertainty in approximating h.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device, comprising:
 one or more processors; and
 memory storing instructions that, when executed by the one or more processors, cause the computing device to:
  initialize a model having a deep neural network architecture and a plurality of model parameters, wherein the deep neural network architecture comprises:
   an input layer, and output layer, a plurality of hidden layers; and
   a memory module having a fixed number of slots, each slot comprising a key, a value, an age indicating a number of memories that have been stored using the memory module subsequent to a memory being stored in the slot, and a variance indicating average uncertainty of differences between embedded data and encoded input data provided to the model;
  train the model, based on a training set comprising a plurality of examples, to refine the plurality of model parameters by processing each example in the training set, wherein processing an example comprises:
   encoding, using the input layer, the example;
   generating, using the plurality of hidden layers, activation data based on the encoded example;
   calculating, using the output layer and based on the activation data and information stored using the memory module, a class label identifying the example; and
   based on determining that the memory module does not have at least one free slot:
    determine a subset of slots in the memory module, wherein the key for each slot in the subset of slots corresponds to the activation data and the value for each slot in the subset of slots corresponds to the class label;
    increment the age for each slot in the subset of slots;
    determine a target slot in the subset of slots;
    generate embedded data representative of the slots in the determined subsets of slots;
    update the key and the value for the target slot based on the activation data, the embedded data, and the class label;
    calculate the variance for the target slot based on the activation data;
    reset the age of the target slot; and
    refine the plurality of model parameters based on the variance for the target slot;
  determine that the trained model, as defined by the refined plurality of model parameters trained using the training set, satisfies one or more stopping criteria; and
  generate one or more predictions based on an input data set using the trained model.

2. The computing device of claim 1, wherein the instructions, when executed by the one or more processors, cause the computing device to process an example by further causing the computing device to, based on determining that the memory module has at least one free slot:
 increment the age for each slot in the memory module that is storing data;
 store, using the memory module, the activation data and the class label using a free slot of the memory module; and
 refine the plurality of model parameters based on a variance calculated based on the activation data and the class label.

3. The computing device of claim 1, wherein the instructions, when executed by the one or more processors, cause the computing device to determine the target slot based on a density model generated based on the activation data and the key for each slot in the subset of slots.

4. The computing device of claim 3, wherein the density model comprises a covariance matrix calculated based on the variance for each slot in the subset of slots.

5. The computing device of claim 3, wherein the density model comprises a set of Gaussian components corresponding to each slot in the subset of slots.

6. The computing device of claim 1, wherein the instructions, when executed by the one or more processors, cause the computing device to increment the age for each slot in the subset of slots by further causing the computing device to:
 determine a maximum age based on the age of each slot in the subset of slots; and
 set the age for each slot in the subset of slots to the maximum age.

7. The computing device of claim 1, wherein the deep neural network architecture comprises a feed-forward neural network.

8. The computing device of claim 1, wherein the deep neural network architecture comprises a convolutional neural network.

9. The computing device of claim 1, wherein the deep neural network architecture comprises a recurrent neural network.

10. The computing device of claim 1, wherein the deep neural network architecture comprises a long short term memory neural network.

11. A method, comprising:
 initializing, by a computing device, a model having a deep neural network architecture and a plurality of model parameters, wherein the deep neural network architecture comprises an input layer, and output layer, a plurality of hidden layers, and a memory having a fixed number of slots, each slot comprising a key, a value, an age indicating a number of memories that have been stored using the memory module subsequent to a memory being stored in the slot, and a variance indicating average uncertainty of differences between embedded data and encoded input data provided to the model;
 training, by the computing device, the model, based on a training set comprising a plurality of examples, to refine the plurality of model parameters by processing each example in the training set, wherein processing an example comprises:
  encoding, using the input layer, the example;
  generating, using the plurality of hidden layers, activation data based on the encoded example;
  calculating, using the output layer and based on the activation data and the memory module, a class label identifying the example;
  determining a subset of slots in the memory module, wherein the key for each slot in the subset of slots corresponds to the activation data and the value for each slot in the subset of slots corresponds to the class label;

incrementing the age for each slot in the subset of slots;

determining a target slot in the subset of slots;

generating embedded data representative of the slots in the determined subset of slots;

updating the key and the value for the target slot based on the activation data, the embedded data, and the class label;

calculating the variance for the target slot based on the activation data;

resetting the age of the target slot; and refining the plurality of model parameters based on the variance for the target slot;

determining, by the computing device, that the trained model, as defined by the refined plurality of model parameters trained using the training set, satisfies one or more stopping criteria; and generating, by the computing device, one or more predictions based on an input data set using the trained model.

12. The method of claim 11, further comprising determining the target slot based on a density model generated based on the activation data and the key for each slot in the subset of slots.

13. The method of claim 12, wherein the density model comprises a covariance matrix calculated based on the variance for each slot in the subset of slots.

14. The method of claim 12, wherein the density model comprises a set of Gaussian components corresponding to each slot in the subset of slots.

15. The method of claim 11, further comprising incrementing the age for each slot in the subset of slots by:
   determining a maximum age based on the age of each slot in the subset of slots; and
   setting the age for each slot in the subset of slots to the maximum age.

16. The method of claim 11, wherein the deep neural network architecture comprises a long short term memory neural network.

17. A non-transitory machine-readable medium storing instructions that, when executed by one or more processors, cause the one or more processors to perform steps comprising:
   initializing a model having a deep neural network architecture and a plurality of model parameters, wherein the deep neural network architecture comprises an input layer, and output layer, a plurality of hidden layers, and a memory module having a fixed number of slots, each slot comprising a key, a value, an age indicating a number of memories that have been stored using the memory module subsequent to a memory being stored in the slot, and a variance indicating average uncertainty of differences between embedded data and encoded input data provided to the model;
   training the model, based on a training set comprising a plurality of examples, to refine the plurality of model parameters by processing each example in the training set, wherein processing an example comprises:
      encoding, using the input layer, the example;
      generating, using the plurality of hidden layers, activation data based on the encoded example;
      calculating, using the output layer and based on the activation data and the memory module, a class label identifying the example;
      based on determining that the memory module has at least one free slot:
         incrementing the age for each slot in the memory module that is storing data;
         storing, using the memory module, the activation data and the class label using one slot of the memory module; and
         refining the plurality of model parameters based on a variance calculated based on the activation data and the class label; and
      based on determining that the memory module does not have at least one free slot:
         determining a subset of slots in the memory module, wherein the key for each slot in the subset of slots corresponds to the activation data and the value for each slot in the subset of slots corresponds to the class label;
         generating embedded data representative of the slots in the determined subset of slots;
         incrementing the age for each slot in the subset of slots;
         determining a target slot in the subset of slots; and
         updating the key and the value for the target slot based on the activation data, the embedded data, and the class label;
         calculating the variance for the target slot based on the activation data;
         resetting the age of the target slot; and
         refining the plurality of model parameters based on the variance for the target slot;
   determining that the trained model, as defined by the refined plurality of model parameters trained using the training set, satisfies one or more stopping criteria; and
   generating one or more predictions based on an input data set using the trained model.

18. The non-transitory machine-readable medium of claim 17, wherein the instructions, when executed by one or more processors, further cause the one or more processors to perform steps comprising determining the target slot based on a density model generated based on the activation data and the key for each slot in the subset of slots.

19. The non-transitory machine-readable medium of claim 18, wherein the density model comprises a set of Gaussian components corresponding to each slot in the subset of slots.

20. The non-transitory machine-readable medium of claim 17, wherein the instructions, when executed by one or more processors, further cause the one or more processors to increment the age for each slot in the subset of slots by:
   determining a maximum age based on the age of each slot in the subset of slots; and
   setting the age for each slot in the subset of slots to the maximum age.

* * * * *